US010216383B2

(12) United States Patent
Moore et al.

(10) Patent No.: US 10,216,383 B2
(45) Date of Patent: Feb. 26, 2019

(54) SINGLE ACTION SELECTION OF DATA ELEMENTS

(71) Applicant: MICROSOFT TECHNOLOGY LICENSING, LLC, Redmond, WA (US)

(72) Inventors: Jason F. Moore, Redmond, WA (US); Justin Mann, Kirkland, WA (US); Martijn E. Van Tilburg, Seattle, WA (US); Colin R. Anthony, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 436 days.

(21) Appl. No.: 14/732,906

(22) Filed: Jun. 8, 2015

(65) Prior Publication Data

US 2015/0268832 A1    Sep. 24, 2015

Related U.S. Application Data

(63) Continuation of application No. 11/220,725, filed on Sep. 8, 2005, now Pat. No. 9,081,470.

(51) Int. Cl.
*G06F 3/048* (2013.01)
*G06F 3/0484* (2013.01)
*G06F 3/0481* (2013.01)

(52) U.S. Cl.
CPC ........ *G06F 3/04845* (2013.01); *G06F 3/0481* (2013.01); *G06F 3/04842* (2013.01); *G06F 3/04847* (2013.01)

(58) Field of Classification Search
CPC ..... G06F 11/324; G06F 9/4443; G06F 3/0482
See application file for complete search history.

(56) References Cited

U.S. PATENT DOCUMENTS

| 6,097,389 | A  | 8/2000  | Morris et al. |
| 7,010,751 | B2 | 3/2006  | Shneiderman |
| 7,136,849 | B2 | 11/2006 | Patrick |
| 7,315,830 | B1 | 1/2008  | Wirtz et al. |
| 7,353,232 | B1 | 4/2008  | Kalucha et al. |

(Continued)

OTHER PUBLICATIONS

"Final Office Action Issued in U.S. Appl. No. 11/220,725", dated Aug. 30, 2010, 16 Pages.

(Continued)

*Primary Examiner* — Rashawn N Tillery
(74) *Attorney, Agent, or Firm* — Shook, Hardy & Bacon L.L.P.

(57) ABSTRACT

Various aspects and attributes of a single-click list selection user interface are described herein. A user can toggle the list inclusion status of any item by single clicking on the item in a selection pane of the user interface. When the user single-clicks a storage container item, the selection pane navigates to and displays items in the selected storage container. In order to prevent inadvertent selections, the user interface may provide graphical feedback indicating the inclusion status of an item prior to the user single clicking that item, e.g., responsive to mouse hover over that item. The user interface may further include a list pane which displays all items presently included in the list, regardless of each item's original storage container.

20 Claims, 5 Drawing Sheets

(56) References Cited

U.S. PATENT DOCUMENTS

| | | |
|---|---|---|
| 7,391,423 B1 | 6/2008 | Manzari et al. |
| 2002/0082887 A1 | 6/2002 | Boyert et al. |
| 2004/0003411 A1 | 1/2004 | Nakai et al. |
| 2004/0175764 A1 | 9/2004 | Nishiyama et al. |
| 2004/0263515 A1* | 12/2004 | Balsiger ............... G06F 9/4443 345/441 |
| 2005/0081159 A1 | 4/2005 | Gupta et al. |
| 2005/0108297 A1 | 5/2005 | Rollin et al. |
| 2006/0026523 A1 | 2/2006 | Kitamaru et al. |
| 2006/0077182 A1 | 4/2006 | Studt |
| 2006/0139312 A1 | 6/2006 | Sinclair et al. |
| 2007/0038938 A1 | 2/2007 | Canora et al. |

OTHER PUBLICATIONS

"Final Office Action Issued in U.S. Appl. No. 11/220,725", dated Feb. 27, 2009, 10 Pages.
"Final Office Action Issued in U.S. Appl. No. 11/220,725", dated Nov. 24, 2009, 16 Pages.
"Non-Final Office Action Issued in U.S. Appl. No. 11/220,725", dated Jun. 23, 2009, 13 Pages.
"Non-Final Office Action Issued in U.S. Appl. No. 11/220,725", dated Mar. 30, 2010, 16 Pages.
"Non-Final Office Action Issued in U.S. Appl. No. 11/220,725", dated Sep. 8, 2014, 21 Pages.
"Non-Final Office Action Issued in U.S. Appl. No. 11/220,725", dated Sep. 8, 2008, 7 Pages.
"Notice of Allowance Issued in U.S. Appl. No. 11/220,725", dated Mar. 5, 2015, 8 Pages.
"Screendumps (Open Item options in Windows XP Professional Version 5.1; 2001)", 2001, 2 Pages.

\* cited by examiner

SINGLE ACTION SELECTION OF DATA ELEMENTS

CROSS-REFERENCE TO RELATED APPLICATIONS

This application claims priority to and is a continuation of U.S. application Ser. No. 11/220,725, filed on Sep. 8, 2005 titled "SINGLE ACTION SELECTION OF DATA ELEMENTS," which is incorporated herein by reference in its entirety.

BACKGROUND

Most computer user interfaces allow a user to provide input using a keyboard as well as a secondary input device, such as a mouse or trackball. The secondary input device is typically used for moving a cursor or pointer on a display screen, and providing input in the form of selection of elements displayed on the display screen at the location of the cursor/pointer. Many secondary input devices have multiple inputs, e.g., multiple buttons, scroll wheels, fingerprint scanner, and the like. A user's interaction with elements on the display screen may be affected based on which of the multiple inputs the user actuates.

In addition, some computer systems differentiate between single-clicking and double-clicking display elements, and perform different actions as a result. For example, many computer systems highlight an item when a user single-clicks on an item displayed on the display screen, and launch an item when the user double-clicks the item displayed on the display screen. The same computer systems may also navigate menus based on single-click selections of menu elements, but require double clicking when selecting elements in other areas of the user interface. In addition, in order for a double-click event to be effective, the user must double-click the input device within a certain amount of time, which is often difficult for some users (e.g., elderly or handicapped individuals).

The above problems result in users being confused by computer user interfaces, making it difficult for all users to succeed at building lists of items in an effective user interface, and having problems manipulating the user interface to accomplish the user's goal, i.e., build a list of a desired set of elements. Another problem that affects the user experience is that users are not able to see the list as it is being built and being easily able to modify the list (e.g., by adding or removing items). Another problem is that the actual user interface mechanism is difficult for users to manipulate physically, e.g., by having to select a small checkbox, drag and drop items directly, or other secondary mechanisms.

Thus, it would be an advancement in the art to provide a more simplistic user interface through which a user could build a list of a desired set of items with less difficulty and complexity than previously provided.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, one or more aspects of the present invention may be directed to a user interface, computer readable media, and/or a method of data navigation and item selection using a single-click selection scheme. A user interface displayed on a display screen may include a selection pane for displaying selectable items corresponding to a first storage location, and further include a list pane for displaying discrete items included within a list. The selectable items include at least one storage location item and at least one discrete item, wherein each storage location item corresponds to a storage location, and wherein each discrete item is capable of being included in the list. When a user single-clicks on a first discrete item, the status of the first discrete item is toggled with respect to inclusion in the list. When a user single-clicks on a first storage location item, the selection pane navigates to a storage location corresponding to the first storage location item, and displays any items stored in the first storage location.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of various illustrative aspects, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
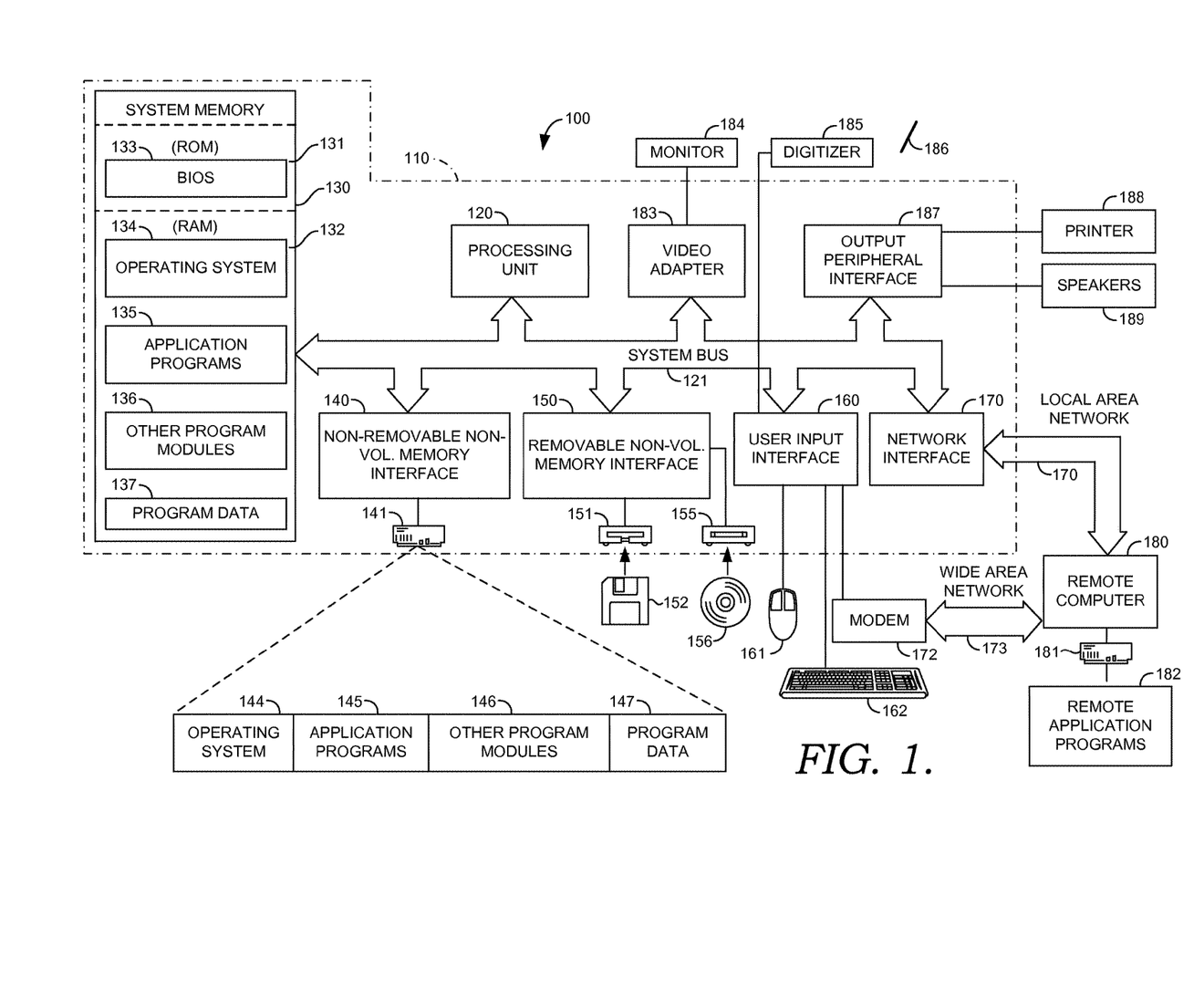
FIG. 1 illustrates a sample operating environment in which one or more illustrative aspects described herein may be implemented.

FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Aspects

Aspects of a list creation system described herein may be particularly useful as a user creates a list of selectable elements or items, e.g., photographs, songs, etc., to include in a list, album, playlist, or the like. Aspects described herein are not limited to such uses, however, and those of skill in the art will appreciate that various aspects and embodiments described herein will have other uses as well. While various aspects are described with respect to user interfaces, those of skill in the art will appreciate that the user interfaces described herein operate under the control of a computer or data processing system such as is described with respect to FIG. 1 or as is otherwise known in the art.

Figure 2:
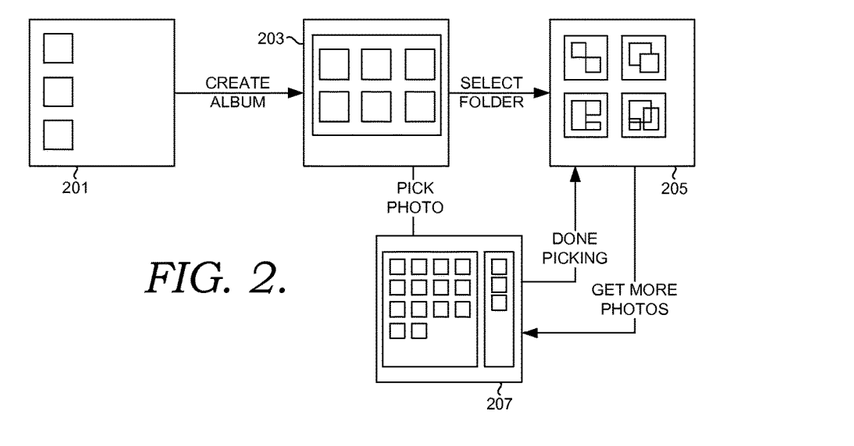
FIG. 2 illustrates a user interface flow diagram according to one or more illustrative aspects described herein.
Figure 3:
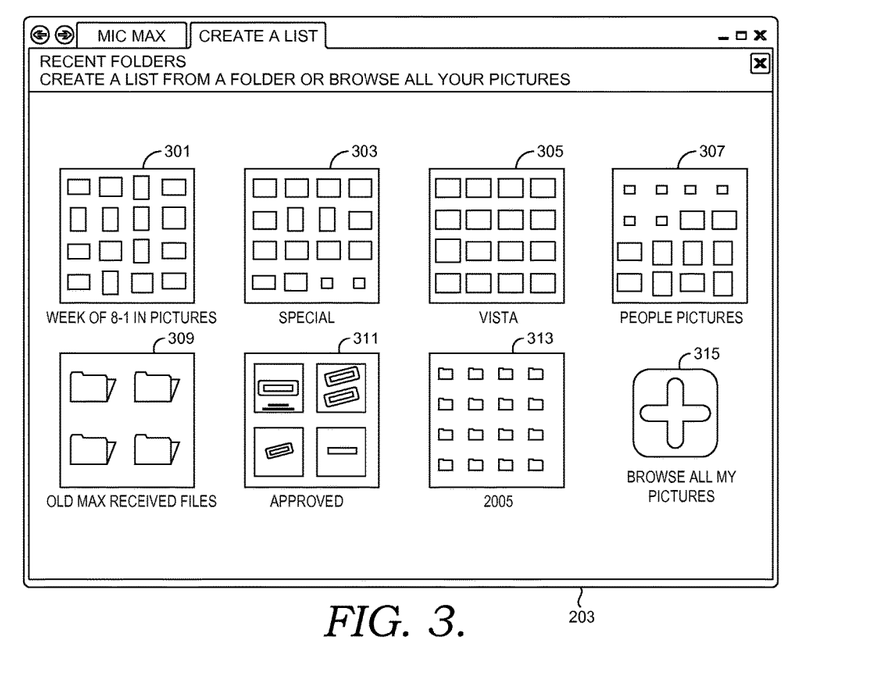
FIG. 3 illustrates a user interface according to one or more illustrative aspects described herein.

FIG. 2 illustrates a sample user interface workflow in which one or more aspects may be included. In FIG. 2, user interface 201 may be a welcome or homepage screen for accomplishing a task, such as making a photo album or music playlist to share with others, or simply for the user's own organization of his or her media. The task referred to herein will be described based on the creation of a list of user-selectable elements or data items. Upon initiation of the creation of a list, user interface 203 allows a user to pick a folder or other storage location or container in which to select individual items for inclusion in the list. An illustrative example of a user interface 203 is illustrated in FIG. 3. UI 203 may display folders according to predetermined criteria, e.g., only folders that contain one or more individual elements (e.g., one or more digital photos for an album; one or more songs for a playlist) directly in them. If more folders exist than there is space available, the folders may be selected based on a Date Created property of the folder and/or an item in the folder, and the most recent n folders (e.g., 8) may be displayed, optionally sorted based on the Date Created property, alphabetically, etc. If a user hovers the cursor/pointer over a folder, the user interface may display a tooltip, e.g., indicating "Make and album with this folder; # of photos:_______; Total Size:_______."

From user interface 203, if the user selects a folder storing individual media items, e.g., any of folders 301-313, then album editing user interface 205 (FIG. 2) allows the user to perform detailed editing of the items in the list, their arrangement, etc. However, if from user interface 203 the user selects to browse all pictures 315 (FIG. 3), or selects an option to "Make a list by selecting the photos and folders yourself" (or equivalent) then the list creation system may display user interface 207 (FIG. 2), through which a user can select which items to include and/or exclude from the list being created/edited by the user. An illustrative example of a user interface 207 is illustrated in FIG. 4.

Figure 4:
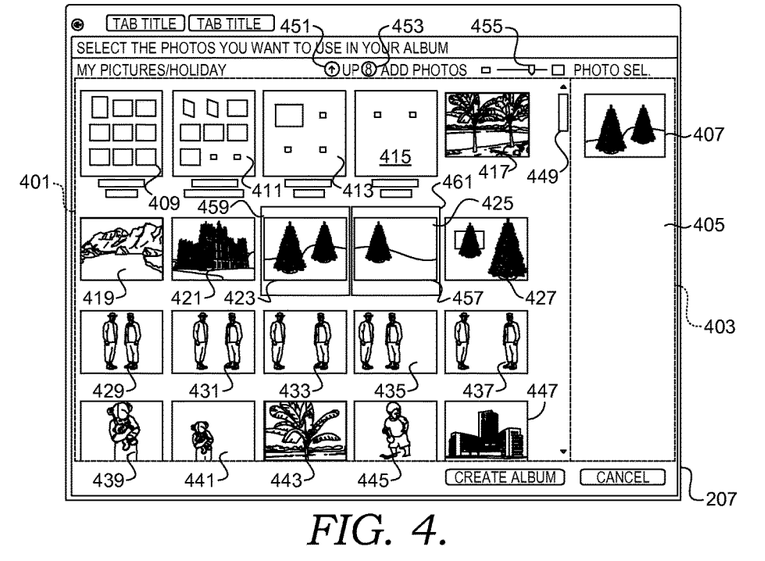
FIG. 4 illustrates another user interface according to one or more illustrative aspects described herein.
Figure 5:
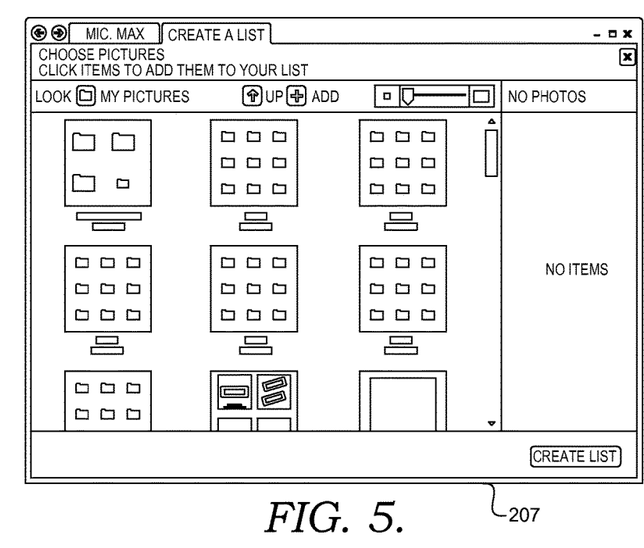
FIG. 5 illustrates another user interface according to one or more illustrative aspects described herein.
Figure 6:
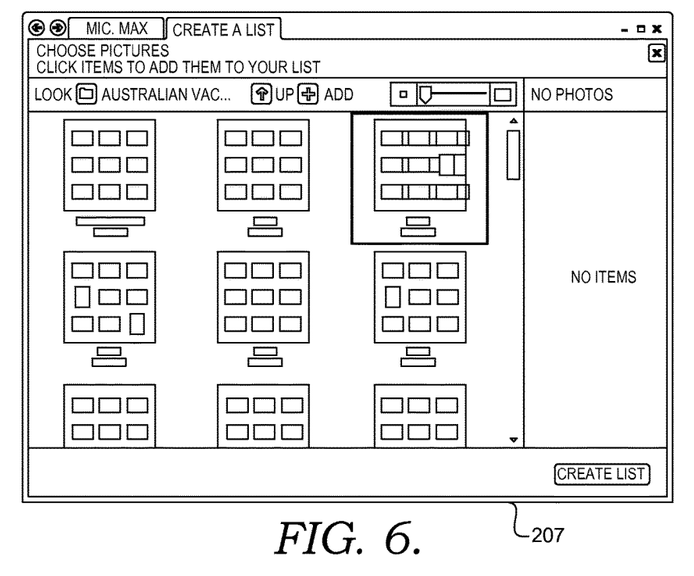
FIG. 6 illustrates another user interface according to one or more illustrative aspects described herein.

FIG. 4 illustrates the primary user interface 207 through which a user creates/edits the contents of a list. FIG. 5 and FIG. 6 illustrate alternative aesthetic appearances of user interface 207, and need not be described separately herein. User interface 207 may include a selection pane 401 and a list pane 403 (also known as a basket control). Selection pane 401 acts as a navigation pane to locate items to include in list 405. List pane 403 displays elements presently included in list 405. The size of the list pane 403 may grow or shrink vertically (described below) in response to resizing of the window, and might prohibit horizontal resizing except to accommodate the current size of displayed thumbnail images.

In FIG. 4 list pane 403 displays element 407, presently the only element in list 405. Selection pane 401 may display storage locations (containers) to which a user can navigate to locate additional items, and may also display individual (discrete) items for selection by the user to include in the list 405. For example, in FIG. 4, selection pane 401 presently displays storage location (container) items 409, 411, 413, and 415, which are selectable by the user for navigation to the selected storage location. Storage locations (containers) may include folders, virtual folders, autolists, previously created lists, directories, storage volumes, queries, and the like. Selection pane 401 further displays discrete items 417-447, which are selectable by the user to include/exclude from the list 405. A user may interact with scroll bar 449 to view additional items in the present storage location, as is known in the art. As illustrated in FIG. 4, individual item 423 is presently included in list 405, illustrated by list element 407 in list pane 403.

User interface 207 may further include additional interactive elements through which a user can manipulate the list 405 or user interface 207. For example, a user can select up navigation button 451 to navigate up to a hierarchically higher storage location, and the user can select Add-All button 453 to add all selectable individual items in selection pane 401 for inclusion in the list 405. A similar Remove-All button may also be provided (not shown). The user may also interact with view slider 455 to change the size of thumbnail images displayed in the selection pane 401 and/or list pane 403.

According to an illustrative aspect, user interface 207 may react or respond to single-click user inputs. The concept of single-click versus double-click, generally, is known in the art and need not be discussed at length herein. However, the use of single-click for selection and navigation has not been used due to heretofore perceived difficulties in creating such a single-click list selection user interface. The difficulties arise from user confusion between selection versus activation of an item. There is a perceived tension between a user selecting an item, thereby making it the recipient of future actions, versus activating an item to carry out some task (e.g., run, delete, copy, move, etc.). In response to this perceived tension, user interface designers use a model that allows for flexibility in actions, thereby avoiding a default single-click action, resulting in a double-click interface that allows a variety of actions with a minimum of user work.

Thus, in order to add an item to the list 405, the user need only select an individual item once, instead of double-clicking as is known in the art. This results in a user interface driven by a current usage scenario, where the main user process (i.e., selecting items, in this example) requires the least amount of work (i.e., the fewest mouse clicks), even if other processes might require more work than with a double-click user interface (e.g., because the user must navigate farther to accomplish an action). For example, to add item 423 (407) to the list 405, the user clicks element 423 once. As a result, element 407 is displayed in list 405, and the user interface 207 displays a first highlight 459 around element 423. Highlight 459 may be displayed around any element already included in list 405. For example, as shown in FIG. 4, element 423 is highlighted to represent inclusion in list 405. Similarly, a folder might be highlighted to indicate that one or more elements stored in or beneath that folder are included in the list. Further, the highlighting around a folder might vary, depending on whether all the items in or beneath the folder are in the list (darker highlight), or whether only one or more but not all of the items in or beneath the folder are in the list (lighter highlight). The user may also click-and-drag items into list pane 403, or right-click an item and select "Add to list" or "Add to basket" from a corresponding context menu. The user may similarly remove items from the list as well.

The list selection system thus performs the most-likely task when a single-click selection action occurs. Different actions may result from single-clicking different types of items. That is, when an individual selectable item is single-clicked, the item is either added or removed from the list. When a storage location item is single-clicked, the user interface navigates to that storage location. Thus, the user saves time by not having to double click items, and users with poorer motor skills can more easily navigate items and create a custom list of items. In addition, clicking on the same item may result in performing different actions depending on a current state of the item. If a selectable individual item is presently not in the list, selecting that item results in its addition to the list. If the same selectable individual item is presented in the list, selecting that item results in its removal from the list. The single-click selection action is context sensitive based on the item and/or its present state.

As displayed in FIG. 4, the user is presently hovering the cursor/pointer 457 over element 425, but has not yet selected element 425 using a single-click input action. As the cursor is hovered over an element, the user interface may display a second highlight 461 indicating an element (individual or storage location) which has input focus. When an individual item has input focus, a single-click (or optionally the Enter key, or some other selection key on the keyboard) by the user will result in the individual item being added to the list 405. When a storage location item has input focus, a single-click (or optionally the Enter key, or some other selection key on the keyboard) by the user will result in the user interface navigating the selection pane 401 to the selected storage location. A user can remove an item from the list 405 by either re-selecting the item in selection pane 401, or by selecting the item in list pane 403, using a single-click selection action.

Because the user interface responds to single-click selection actions, users might not realize that they made a selection mistake until after the incorrect selection had been made. That is, in a double-click based user interface, a user can often single-click a selectable element to obtain a preview of a result of a corresponding double-click selection action. However, in a single-click user interface such as that contemplated herein, when a user single-clicks, the user-interface performs the resultant action. Thus, according to an illustrative aspect, in order to stave off mistakes, inadvertent actions, and incorrect selections, in addition to or instead of providing highlight 461, the user interface may change the appearance of cursor/pointer 457 based on an action that would result from the user performing a single-click selection action while the cursor/pointer 457 is hovering over a particular item having input focus.

Figure 7:
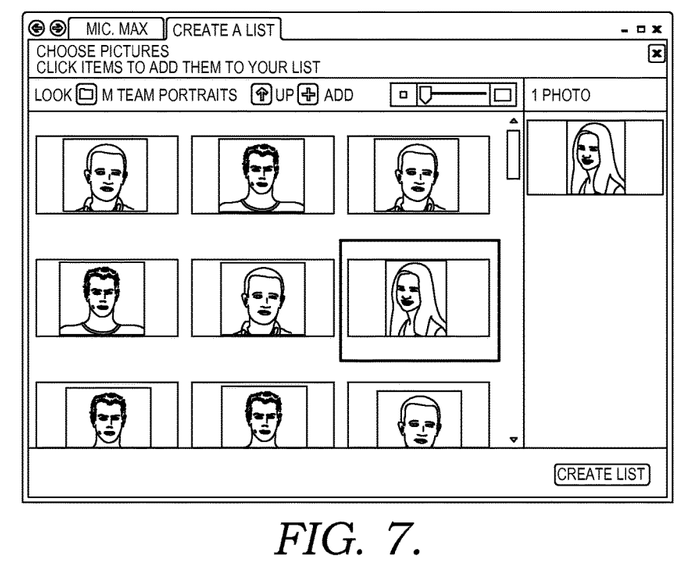
FIG. 7 illustrates another user interface according to one or more illustrative aspects described herein.

For example, FIG. 4 illustrates cursor/pointer 457 hovering over selectable individual item 425, resulting in item 425 having input focus. The user single-clicking on item 425 will result in item 425 being added to list 405. Thus, user interface 207 displays cursor/pointer 457 with a '+' icon to indicate that, should the user single-click the hovered item, the single-click action will result in the addition of that item 425 to the list 405. As the user moves the cursor/pointer 457 over another item, the appearance of the cursor/pointer 457 may change appropriately. For example, if the user hovers the cursor/pointer 457 over an item already in list 405, the user interface may display the cursor/pointer 457 with a '−' icon to indicate that, should the user single-click the presently hovered item, the single-click action will result in the removal of that item from the list. Such an indication is illustrated in FIG. 7. While the cursor/pointer is hovering over a storage location item, the cursor/pointer 457 might not include any secondary indication, or might include yet a different secondary indication (not shown) to represent navigation to the hovered storage location.

Tooltips (i.e., short messages displayed by the cursor after a predetermined delay when the cursor is not moving) may also be used to indicate to the user the prospective result of a single-click selection action. For example, a tooltip similar to "Add Item" may be displayed shortly after the cursor appears with a '+' icon. Likewise a tooltip similar to "Remove Item" may be displayed shortly after the cursor appears with a '−' icon. The tooltip "Open Location" (or similar) may be displayed shortly after the cursor is hovered over a storage location item. Tooltips and/or alternative cursor appearances may be used in conjunction with each other or independently, as desired.

Figure 8:
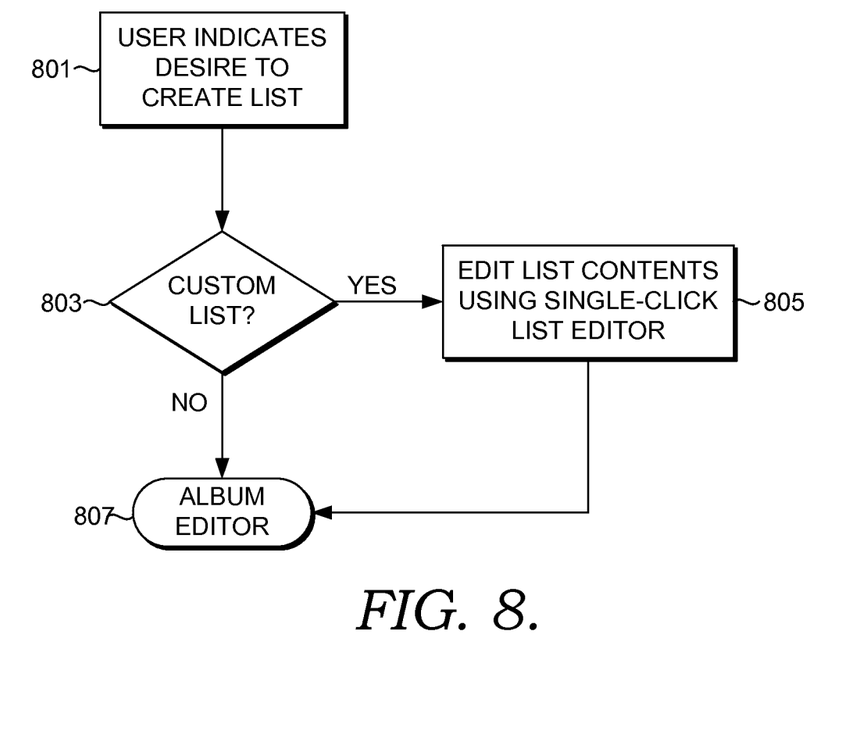
FIG. 8 illustrates a flowchart for a method of editing list contents according to one or more illustrative aspects described herein.

FIG. 8 illustrates a sample method which may be used to select one or more items for inclusion in a list, according to various illustrative aspects and embodiments described herein. In step 801, the user indicates the desire or intent to create a list of items, such as digital photos or songs. For example, the user may select a "Create Album" option from user interface 201 (FIG. 2). In step 803 the user may select a folder from which the list may be created (e.g., elements 301-313 in FIG. 2), in which case the list is created having elements from the selected storage location and the system launches an album editor in step 807 for the user to perform more detailed customization of the list. Alternatively in step 803 the user may select an option to create a custom list, in which case the user interface displays UI 207 (FIG. 4). In step 805 the user can select items for inclusion in the list, or remove items from the list, using single-click user interface 207, and then launch the album editor in step 807. Those of skill in the art will appreciate that steps may be combined or joined together, and that one or more steps may be optional.

Those of skill in the art will further appreciate that modifications and/or enhancements may be made without departing from the scope and/or spirit of the features described herein. For example, the user interface may provide a link to display already created lists from which items may be chosen. The already created lists may be displayed separately or included as possible storage locations navigable by the user. Another possible alternative is to indicate whether a user must perform a single-click or double-click to accomplish an action or task using different cursor representations. For example, the finger pointer representation in FIGS. 4 and 7 might indicate a single-click is required to perform a desired action, or that the user interface is in a single-click mode of operation, whereas the arrow pointer representation in FIG. 6 might indicate a double-click is required to perform a desired action, or that the user interface is in a double-click mode of operation. The mode of operation might be a toggle setting configurable by the user via a control panel (not shown). Yet another possible alternative is to include instructions to the user in each user interface where the user performs a single-click to perform a desired action. For example, in the embodiment illustrated in FIGS. 5-7, each user interface includes the instructional text "Click items to add them to your list. " Such instructional text, or alternative instructional text, might be included on any user interface using single-click inputs.

In addition, various aspects of the list selection user interface described herein may be used as or in conjunction with a common file dialog box of an application program, operating system, or other data processing system. That is, upon receiving a request for a common file dialog, the system may launch a list selection user interface such as or similar to that described herein, where a user can select one or more files as input to the application program. When the user has selected one or more desired files, the user can provide input that the list contents are acceptable (e.g., selecting an "Open" or "Finished" button), and the common file dialog passes an indication of the list contents to the application program. The indication of the list contents may include, for example, links or shortcuts to each item in the list, or may include a copy of each item in the list.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computing device, the computing device comprising:
a touch surface for receiving an input focus for a selectable container or a selectable individual item rendered on a display; and
a stylus that causes one or more modifications to a rendering of the input focus on the display after the input focus remains above the region of the touch surface corresponding to the selectable container or the selectable individual item for a preconfigured amount of time without engaging the region of the touch surface, wherein the modification of the rendering of the input focus provides a visual representation of a next action that would be applied to the selectable container or the selectable individual item in response to a subsequent single-touch selection action of at least a portion of the region of the touch surface corresponding to the selectable container or the selectable individual item, wherein for the container, the modification of the rendering of the input focus indicates the next action comprises navigating to a storage location corresponding to the container, and wherein for the individual item, the modification of the rendering of the input focus indicates the next action comprises including the individual item in a list.

2. The computing device of claim 1, wherein the touch surface renders on the display a selection pane for displaying selectable individual items or selectable containers and a list pane for displaying selectable individual items included within the list.

3. The computing device of claim 2, wherein a status of the selectable individual item with respect to inclusion in the list is toggled in response to a single-touch selection action of the region of the touch surface corresponding to the selectable individual item.

4. The computing device of claim 3, wherein a graphical indication is displayed of the status of the selectable individual item when the selectable individual item is in the list.

5. The computing device of claim 4, wherein the graphical indication comprises highlighting the selectable individual item in the selection pane.

6. The computing device of claim 1, wherein each selectable individual item comprises a digital image, and the list is a virtual photo album.

7. The computing device of claim 1, wherein each selectable individual item comprises an audio file, and the list is a playlist.

8. The computing device of claim 2, wherein each selectable individual item is selectable by an application program,
wherein rendering the selectable individual item on the display is initiated as a result of the application program requesting a common file dialog, and
wherein upon receiving user input indicating the list contents are accepted, sending the list contents to the application program as the output of the common file dialog.

9. The computing device of claim 1, wherein a status of the selectable individual item with respect to inclusion in the list is toggled upon receiving user input selecting a context menu item from a context menu corresponding to the selectable individual item.

10. The computing device of claim 1, wherein the selectable container comprises a virtual folder defined by a user-specified query.

11. The computing device of claim 2, wherein a graphical indication is displayed of the status of the selectable container when at least one other selectable individual item stored beneath the selectable container item is in the list.

12. One or more computer readable media storing computer executable instructions for providing a user interface allowing a user to select items within contents of a list, said user interface comprising:
- an item selection pane displaying a plurality of items, said plurality of items comprising at least one container item and at least one discrete item capable of being included in the list;
- a list pane displaying any contents of the list; and
- a pointer controlled by a user-input device, said pointer for pointing to, hovering over, and selecting, any of the plurality of items,
- wherein upon the user hovering the pointer over at least a portion of one of the plurality of items, the user interface alters the appearance of the pointer to indicate a next action that would be applied to the item in response to the user subsequently single-clicking the pointer,
- wherein for a container item, the altered appearance of the pointer indicates the next action comprises navigating to a storage location corresponding to the container item, and wherein for a discrete item, the altered appearance of the pointer indicates the next action comprises including the discrete item in a list;
- wherein upon the user single-clicking the pointer on any container item, the user interface navigates to a storage location corresponding to the container item and displays a plurality of items included in the container item in the selection pane, and
- wherein upon the user single-clicking the pointer on any discrete item, the user interface includes the single-clicked discrete item in the list.

13. The computer readable media of claim 12, wherein upon the user pointing the pointer at a first discrete item, the user interface alters the appearance of the pointer to indicate an inclusion status of the first discrete item with respect to the list.

14. The computer readable media of claim 12, wherein the item selection pane further displays a graphical indication corresponding to any items included in the list.

15. The computer readable media of claim 14, wherein the graphical indication comprises highlighting any items included in the list.

16. The computer readable media of claim 12, wherein each discrete item comprises a digital image, and wherein the list is a virtual photo album.

17. The computer readable media of claim 12, wherein each discrete item comprises an audio file, and wherein the list is a playlist.

18. The computer readable media of claim 12, wherein the user interface further comprises a user-selectable element to indicate that the list contents are accepted,
- wherein each discrete item comprises an item usable by an application program, and
- wherein the computer readable medium further stores computer executable instructions for performing a method comprising:
- responsive to receiving a request from the application program for a common file dialog, launching the user interface;
- responsive to receiving user input selecting the user-selectable element to indicate that the list contents are accepted, providing an indication of the list contents to the application program.

19. The computer readable media of claim 18, wherein the indication of the list contents comprises a link to each item in the list.

20. One or more computer readable media storing computer executable instructions for providing a user interface allowing a user to select items within contents of a list, said user interface comprising:
- an item selection pane displaying a plurality of items, said plurality of items comprising at least one container item and at least one discrete item capable of being included in the list;
- a list pane displaying any contents of the list; and
- a pointer controlled by a user-input device, said pointer for pointing to, hovering over, and selecting, any of the plurality of items,
- wherein upon the user hovering the pointer over at least a portion of one of the plurality of items for a preconfigured amount of time, the user interface alters the appearance of the pointer to indicate a next action that would be applied to the item in response to the user subsequently single-clicking the pointer,
- wherein for a container item, the altered appearance of the pointer indicates the next action comprises navigating to a storage location corresponding to the container item, and wherein for a discrete item, the altered appearance of the pointer indicates the next action comprises including the discrete item in a list;
- wherein upon the user single-clicking the pointer on any container item, the user interface navigates to the container item and displays a plurality of items included in the container item in the selection pane, and
- wherein upon the user single-clicking the pointer on any discrete item, the user interface toggles includes the single-clicked discrete item in the list.

* * * * *